(No Model.)
A. E. BROCKETT.
PIPE WRENCH.
No. 605,441. Patented June 7, 1898.
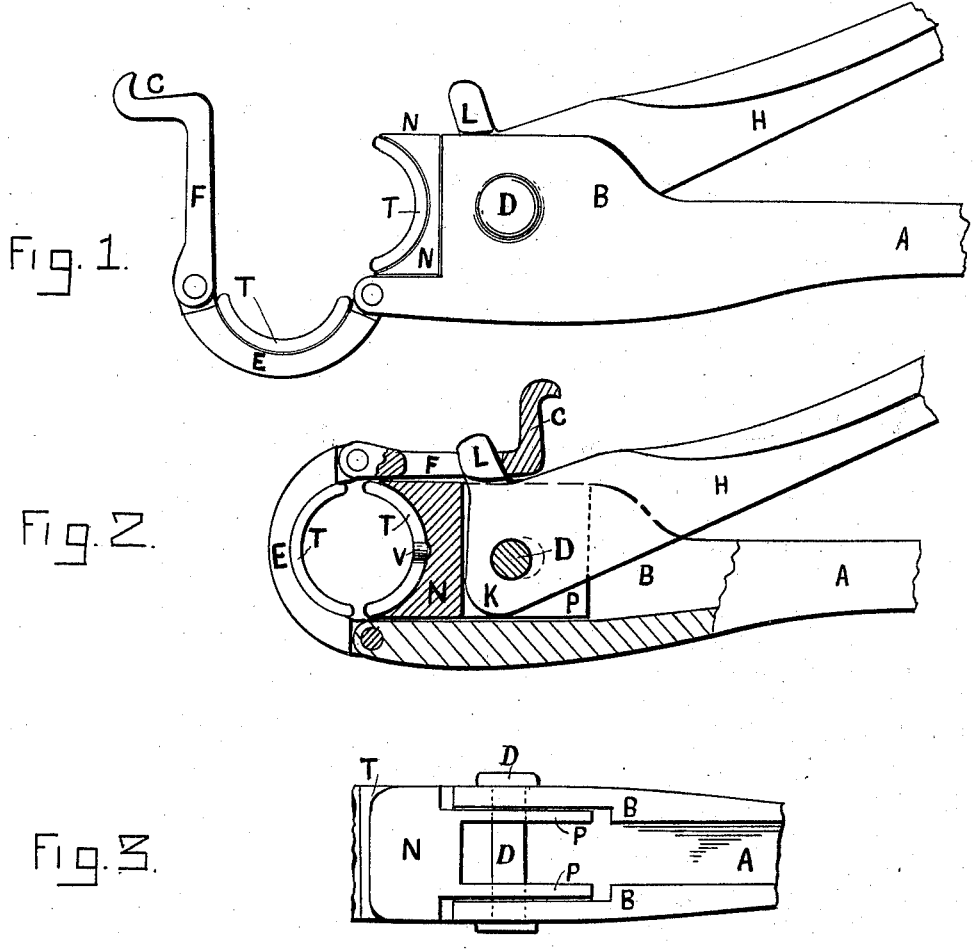
WITNESSES
Henry Houghton
E. G. Emanuel
INVENTOR
Atwater E. Brockett,
By Sylvenus J. Walker
Attorney

UNITED STATES PATENT OFFICE.

ATWATER E. BROCKETT, OF EVERETT, MASSACHUSETTS, ASSIGNOR TO WILLIAM G. NIXON, OF BRAINTREE, MASSACHUSETTS.

PIPE-WRENCH.

SPECIFICATION forming part of Letters Patent No. 605,441, dated June 7, 1898.

Application filed May 14, 1896. Renewed May 14, 1898. Serial No. 680,751. (No model.)

*To all whom it may concern:*

Be it known that I, ATWATER E. BROCKETT, of Everett, in the county of Middlesex and State of Massachusetts, have invented an Improvement in Pipe-Wrenches, of which the following is a specification.

The object of my invention is to provide a cheap, simple, convenient, and efficient pipe-wrench, and more especially adapted for operation upon brass pipes or those having a finished exterior surface; and it consists in the construction, combination, and arrangement of the several parts of the wrench, as hereinafter more fully described, and specifically set forth in the claim.

In the drawings hereto annexed, which form a part of this specification, reference is made.

Figure 1 represents a side elevation showing a pipe-wrench constructed according to my invention, with the clamp-jaws opened to receive therein a piece of pipe to be clamped thereby and turned so as to screw the same into a coupling, a portion of the handles being omitted or broken away. Fig. 2 represents a sectional elevation of the same with the clamp-jaws closed ready to grip a pipe by closing the handles, both jaws being forced toward or against the opposite sides of the pipe by the action of the lever-handle. Fig. 3 represents a top plan of a portion of the same, showing the position of the inner sliding jaw when acted upon by the eccentric end portion of the lever-handle, being omitted to show the construction of the same.

A represents the main lower handle, provided on opposite sides with vertical flanges B, which taper toward the extreme outward end portion of the same in order to secure strength and lightness. To the operative end of the said handle A is pivoted or hinged a swinging or adjustable segmental clamp-jaw E, the opposite end of which has pivoted or hinged thereto a coupling-link F, provided at its free end with a manipulating projection C, by means of which the said link F may be connected or disconnected, as shown. Now between the said vertical flanges B is pivoted the upper or opposite lever-handle H by means of the fulcrum bolt or pin D, passing into and through suitable holes formed in the said flanges B and through the said lever-handle H, the extreme inward lower end of which is formed or provided with an actuating eccentric corner K and the opposite upper side end portion with a short projecting stud or lug L, over which the said pivoted link or hinged coupling-link F may be placed when desired to actuate the said segmental or clamp jaw E, as hereinafter described. Within the space between the said flanges B is loosely fitted the sliding clamp-jaw N, the working face of which is formed to correspond with the opposite segmental clamp-jaw E and the opposite end portion with parallel flanges P, between which is loosely fitted the end portion K of the said handle-lever H, the said fulcrum bolt or pin D passing through suitable elongated holes formed through the said flanges P, so as to permit said clamp-jaw N to slide toward the opposite clamp-jaw E, as shown in Fig. 3, the lever-handle not being shown. The operation will be clearly understood by reference to Fig. 2, as hereinafter described. The segmental faces T of the said clamp-jaws E N may be removed from the short holding-pins V and toothed or angle-faced jaws applied, if desired. Now it will be seen and understood that the removable segmental clamp-jaw faces T may be easily detached from the said clamp-jaws E N and others substituted of any desired size or shape adapted to serve the purpose contemplated. The operation of this pipe-wrench may be stated briefly, as the drawings fully illustrate the same.

It will be seen that in order to apply the wrench to a piece of horizontal pipe to turn the same place the inward jaw N in contact with the pipe, the opposite jaw E being in the position shown in Fig. 1, then turn the link F over the pipe into the position shown in Fig. 2, then press the lever-handle H toward the opposite handle A, and continue such pressure until the handles are brought close together, when the clamp-jaws E and N will have slightly compressed the pipe and the frictional contact will be sufficient thereon to turn the pipe with great force, so as to screw the same into the corresponding screw-threaded coupling, as usual.

Having thus described my invention, I claim—

In a pipe-wrench, the handle A having the flanges B and provided with the pivoted clamp-jaw E having the pivoted coupling-link F, and the pivoted lever-handle H having the eccentric K and projecting stud L, the sliding clamp-jaw N having flanges P, fulcrum-bolt D, and the removable face-pieces T, all constructed combined and arranged, substantially as set forth.

ATWATER E. BROCKETT.

Witnesses:
    SYLVENUS WALKER,
    W. G. NIXON.